(12) United States Patent
Kim et al.

(10) Patent No.: US 12,743,177 B2
(45) Date of Patent: Sep. 22, 2026

(54) FLAT PANEL DISPLAY WITH INTEGRATED TOUCH SCREEN PANEL

(71) Applicant: SAMSUNG DISPLAY CO., LTD., Yongin-si (KR)

(72) Inventors: Jong-Soo Kim, Yongin-si (KR); Do-Youb Kim, Yongin-si (KR); Myoung-Seop Song, Yongin-si (KR); Sang-Kyun Cho, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/226,095

(22) Filed: Jun. 2, 2025

(65) Prior Publication Data

US 2025/0291445 A1 Sep. 18, 2025

Related U.S. Application Data

(63) Continuation of application No. 18/373,249, filed on Sep. 26, 2023, now Pat. No. 12,321,555, which is a
(Continued)

(30) Foreign Application Priority Data

Sep. 14, 2010 (KR) ........................ 10-2010-0089955

(51) Int. Cl.
*G06F 3/044* (2006.01)
*G06F 3/041* (2006.01)

(52) U.S. Cl.
CPC ............ *G06F 3/0443* (2019.05); *G06F 3/041* (2013.01); *G06F 3/0412* (2013.01); *G06F 3/044* (2013.01); *G06F 3/0446* (2019.05)

(58) Field of Classification Search
CPC ........ G06F 3/0412; G06F 3/041; G06F 3/044; G06F 3/0443; G06F 3/0446
See application file for complete search history.

(56) References Cited

U.S. PATENT DOCUMENTS 6,529,188 B1 * 3/2003 Suzuki ................ G02F 1/13338 345/173
6,885,157 B1 * 4/2005 Cok .................... G06F 3/04164 345/173

(Continued)

FOREIGN PATENT DOCUMENTS

CN 1591876 3/2005
CN 1729719 2/2006

(Continued)

OTHER PUBLICATIONS

Korean Office Action dated Oct. 30, 2017, issued in the Korean Patent Application No. KR 10-2010-0089955.

(Continued)

*Primary Examiner* — Dmitriy Bolotin
(74) *Attorney, Agent, or Firm* — Womble Bond Dickinson (US) LLP

(57) ABSTRACT

A flat panel display having an integrated touch screen panel directly formed on a sealing thin film is disclosed. In the display, sensing lines of the touch screen panel are formed to extend to a substrate of the display panel, on which organic light emitting elements are formed, so that the touch screen panel and the display panel are connected to a flexible printed circuit board, thereby simplifying manufacturing processes and decreasing product cost.

20 Claims, 3 Drawing Sheets

Related U.S. Application Data continuation of application No. 17/149,632, filed on Jan. 14, 2021, now Pat. No. 11,809,663, which is a continuation of application No. 16/677,191, filed on Nov. 7, 2019, now Pat. No. 10,895,926, which is a continuation of application No. 16/005,694, filed on Jun. 12, 2018, now Pat. No. 10,474,270, which is a continuation of application No. 15/133,605, filed on Apr. 20, 2016, now Pat. No. 10,013,088, which is a continuation of application No. 13/021,581, filed on Feb. 4, 2011, now Pat. No. 9,323,400.

(56) References Cited

U.S. PATENT DOCUMENTS 7,221,013 B2* 5/2007 Goto .................. H10D 1/711 257/306
7,629,740 B2 12/2009 Sano et al.
7,902,755 B2 3/2011 Kubota
7,936,121 B2 5/2011 Kim
8,330,734 B2* 12/2012 Oohira .................. G06F 3/0412 345/173
8,576,182 B2* 11/2013 Hristov .................. G06F 3/04184 345/173
8,598,787 B2 12/2013 Bouten et al.
9,323,400 B2* 4/2016 Kim .................. G06F 3/041
9,342,176 B2 5/2016 Kim et al.
9,377,905 B1* 6/2016 Grivna .................. G06F 3/0446
10,013,088 B2* 7/2018 Kim .................. G06F 3/0412
10,474,270 B2* 11/2019 Kim .................. G06F 3/0443
10,895,926 B2* 1/2021 Kim .................. G06F 3/041
11,809,663 B2 11/2023 Kim et al.
12,321,555 B2* 6/2025 Kim .................. G06F 3/0443
2002/0171610 A1* 11/2002 Siwinski .................. H10K 59/40 345/173
2002/0186208 A1* 12/2002 Feldman .................. G06F 3/04164 345/173
2004/0185301 A1* 9/2004 Tsuchiya .................. H10K 59/871 257/E27.111
2005/0051829 A1* 3/2005 Goto .................. H10D 1/682 257/E21.012
2005/0172722 A1* 8/2005 Kobayashi .................. G01L 5/228 73/754
2007/0242055 A1 10/2007 Lai
2008/0116795 A1* 5/2008 Tsuchiya .................. H10D 86/0221 257/E27.111
2008/0143683 A1* 6/2008 Hotelling .................. H05K 1/0353 345/173
2008/0211975 A1* 9/2008 Sera .................. G02F 1/13394 349/12
2008/0278070 A1 11/2008 Kim
2009/0322702 A1* 12/2009 Chien .................. G06F 3/0445 345/174
2010/0007616 A1* 1/2010 Jang .................. G06F 3/0445 345/173
2010/0033443 A1* 2/2010 Hashimoto .................. G06F 3/044 345/173
2010/0060601 A1* 3/2010 Oohira .................. G02F 1/133308 345/173
2010/0108409 A1* 5/2010 Tanaka .................. G06F 3/0412 345/174
2010/0182249 A1* 7/2010 Kang .................. G06F 3/0446 345/173
2010/0182272 A1* 7/2010 Kang .................. G06F 3/0445 430/319
2010/0194699 A1* 8/2010 Chang .................. G06F 3/0412 345/173
2010/0194707 A1* 8/2010 Hotelling .................. G06F 3/041 345/55
2010/0214247 A1* 8/2010 Tang .................. G06F 3/04164 200/600
2010/0244073 A1* 9/2010 Ito .................. H10K 50/8426 257/E33.059
2010/0309150 A1* 12/2010 Lee .................. G06F 3/0412 345/173
2011/0012845 A1* 1/2011 Rothkopf .................. G06F 3/0446 345/173
2011/0048812 A1* 3/2011 Yilmaz .................. G06F 3/04164 178/18.06
2011/0095999 A1* 4/2011 Hayton .................. G06F 1/1652 345/206
2011/0128240 A1* 6/2011 Choi .................. G06F 3/0445 345/173
2011/0216018 A1* 9/2011 Kim .................. G06F 3/0443 345/173
2011/0298744 A1* 12/2011 Souchkov .................. G06F 3/0446 345/174
2012/0032917 A1* 2/2012 Yamaguchi .................. G06F 3/04164 345/174
2012/0062481 A1* 3/2012 Kim .................. G06F 3/0412 345/173
2017/0269750 A1* 9/2017 Kang .................. H10D 86/441
2018/0342185 A1* 11/2018 Lee .................. G01R 27/08
2023/0297195 A1* 9/2023 He .................. G06F 3/041 345/174

FOREIGN PATENT DOCUMENTS

CN 101626017 1/2010
CN 101766055 6/2010
JP 2005-317476 11/2005
JP 2008-091237 4/2008
JP 2008-233976 10/2008
JP 2010-182093 8/2010
KR 10-2008-0099684 11/2008
KR 10-0873080 12/2008
KR 10-2010-001 0019 1/2010
KR 10-2010-0007717 A 1/2010
KR 10-2010-0061121 6/2010

OTHER PUBLICATIONS

Non-Final Office Action dated May 20, 2016, issued in the U.S. Appl. No. 15/133,605.
Final Office Action dated Jan. 3, 2017, issued in the U.S. Appl. No. 15/133,605.
Non-Final Office Action dated Apr. 21, 2017, issued in the U.S. Appl. No. 15/133,605.
Final Office Action dated Aug. 9, 2017, issued in the U.S. Appl. No. 15/133,605.
Non-Final Office Action dated Nov. 16, 2017, issued in the U.S. Appl. No. 15/133,605.
Notice of Allowance dated Mar. 25, 2017, issued in the U.S. Appl. No. 15/133,605.
Non-Final Office Action dated Jul. 12, 2018, issued in the U.S. Appl. No. 16/005,694.
Final Office Action dated Dec. 31, 2018, issued in the U.S. Appl. No. 16/005,694.
Notice of Allowance dated Jul. 17, 2019, issued in the U.S. Appl. No. 16/005,694.
Non-Final Office Action mailed Jun. 11, 2020, in U.S. Appl. No. 16/677,191.
Notice of Allowance dated Sep. 23, 2020, issued in the U.S. Appl. No. 16/677,191.
Non-Final Office Action dated Sep. 30, 2021, in U.S. Appl. No. 17/149,632.
Final Office Action dated Jan. 20, 2022, in U.S. Appl. No. 17/149,632.
Non-Final Office Action dated Apr. 28, 2022, in U.S. Appl. No. 17/149,632.
Final Office Action dated Sep. 1, 2022, in U.S. Appl. No. 17/149,632.
Notice of Allowance dated Mar. 28, 2023, in U.S. Appl. No. 17/149,632.
Notice of Allowance dated Jun. 26, 2023, in U.S. Appl. No. 17/149,632.

* cited by examiner

FLAT PANEL DISPLAY WITH INTEGRATED TOUCH SCREEN PANEL

CROSS-REFERENCE TO RELATED APPLICATIONS

This application is a Continuation of U.S. patent application Ser. No. 18/373,249, filed on Sep. 26, 2023, which is a Continuation of U.S. patent application Ser. No. 17/149,632, filed on Jan. 14, 2021, now U.S. Pat. No. 11,809,663, which is a Continuation of U.S. patent application Ser. No. 16/677,191, filed on Nov. 7, 2019, now U.S. Pat. No. 10,895,926, which is a Continuation of U.S. patent application Ser. No. 16/005,694, filed on Jun. 12, 2018, now U.S. Pat. No. 10,474,270, which is a Continuation of U.S. patent application Ser. No. 15/133,605, filed on Apr. 20, 2016, now U.S. Pat. No. 10,013,088, which is a Continuation of U.S. patent application Ser. No. 13/021,581, filed on Feb. 4, 2011, now U.S. Pat. No. 9,323,400, which claims priority to and the benefit of Korean Patent Application No. 10-2010-0089955, filed on Sep. 14, 2010, the entire content of all of which is incorporated herein by reference.

BACKGROUND

Field

The disclosed technology relates to a flat panel display, and more particularly, to a flat panel display with an integrated touch screen panel.

Discussion of the Background

A touch screen panel is an input device that allows a user's instruction to be inputted by selecting an instruction content displayed on a screen of a display or the like with a user's hand or an object.

To this end, the touch screen panel is formed on a front face of the display and is capable of converting a contact position into an electrical signal. The user's hand or object directly contacts the touch screen panel at the contact position. Accordingly, the instruction content selected at the contact position is inputted as an input signal to the display.

Since such a touch screen panel can be substituted for a separate input device connected to a display, such as a keyboard or mouse, its application fields have been gradually extended.

Touch screen panels may be categorized as a resistive overlay touch screen panel, a photosensitive touch screen panel, a capacitive touch screen panel, and the like. Among these touch screen panels, the capacitive touch screen panel converts a contact position into an electrical signal by sensing a change in capacitance formed between a conductive sensing pattern and an adjacent sensing pattern, ground electrode or the like when a user's hand or object is in contact with the touch screen panel.

Such a touch screen panel is generally attached to an outer surface of a flat panel display such as a liquid crystal display or organic light emitting display. In a case where a separately manufactured touch screen panel is attached to a flat panel display, the entire thickness of a product is increased, and manufacturing cost is increased.

In this case, a driving IC for a flat panel display and a driving IC for a touch screen panel are separate from the flat panel display and the touch screen panel, and therefore, it is difficult to achieve compatibility between products. Since the driving ICs are necessarily connected to separate flexible printed circuit boards (FPCBs), respectively, a manufacturing process is complicated, and product cost is increased.

SUMMARY

One aspect is a display. The display includes a substrate including a first area having a pixel area and a second area adjacent to the first area. The display further includes a plurality of pixels in the pixel area of the substrate. The display further includes an encapsulation layer on the first area of the substrate, the encapsulation layer including an inclined surface. The display further includes a plurality of sensing cells on the encapsulation layer. The display further includes a plurality of sensing lines on the encapsulation layer, the plurality of sensing lines connected to the sensing cells. The display further includes a driving circuit electrically connected to the sensing cells via the sensing lines. The sensing lines extend from the sensing cells along the inclined surface of the encapsulation layer to the second area of the substrate. The sensing lines are electrically connected to the driving circuit.

Another aspect is a display. The display includes a substrate including a first area having a pixel area and a second area adjacent to the first area. The display further includes a plurality of pixels in the pixel area of the substrate. The display further includes an encapsulation layer on the first area of the substrate to inhibit infiltration of oxygen and moisture into the pixels and including and inclined surface. The display further includes a plurality of sensing cells on an outer surface of the encapsulation layer. The display further includes a plurality of sensing lines on the outer surface of the encapsulation layer and connected to the sensing cells. The display further includes a driving circuit electrically connected to the sensing cells through the sensing lines. The sensing lines extend from the sensing cells along the inclined surface of the encapsulation layer to the second area of the substrate. The sensing lines are electrically connected to the driving circuit.

BRIEF DESCRIPTION OF THE DRAWINGS

The accompanying drawings, together with the specification, illustrate exemplary embodiments, and, together with the description, serve to explain various inventive aspects and principles.

DETAILED DESCRIPTION

Figure 1:
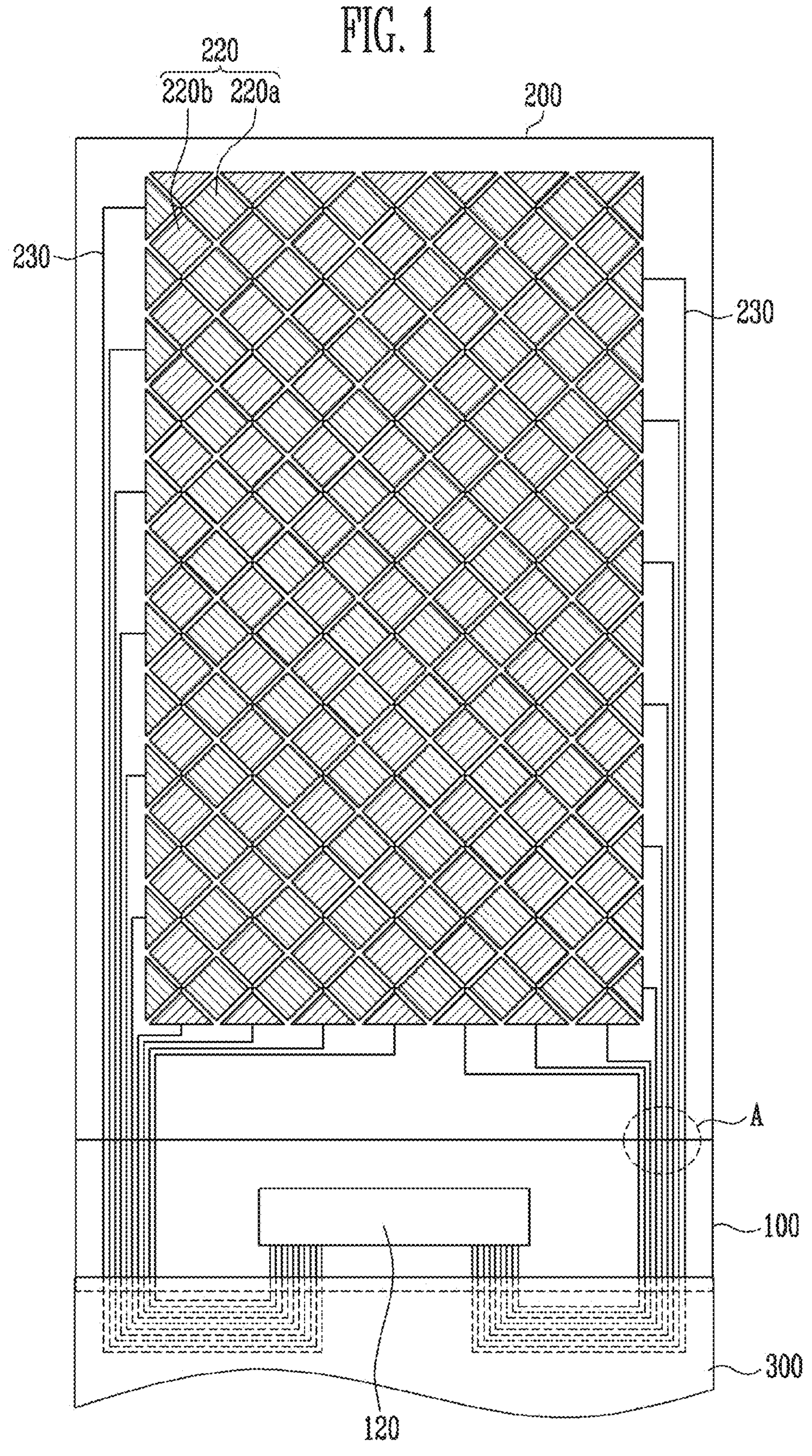
FIG. 1 is a plan view of a flat panel display with an integrated touch screen panel according to an embodiment of the present invention.

In the following detailed description, only certain exemplary embodiments have been shown and described. As those skilled in the art would realize, the described embodiments may be modified in various ways, without departing from the spirit or scope of the present invention. Accordingly, the drawings and description are to be regarded as illustrative in nature and not restrictive. In addition, when an element is referred to as being "on" another element, it can be directly on another element or be indirectly on another element with one or more intervening elements interposed therebetween. Also, when an element is referred to as being "connected to" another element, it can be directly connected to another element or be indirectly connected to another element with one or more intervening elements interposed therebetween. Hereinafter, like reference numerals generally refer to like elements.

Hereinafter, exemplary embodiments of the present invention will be described in detail with reference to the accompanying drawings.

Figure 2:
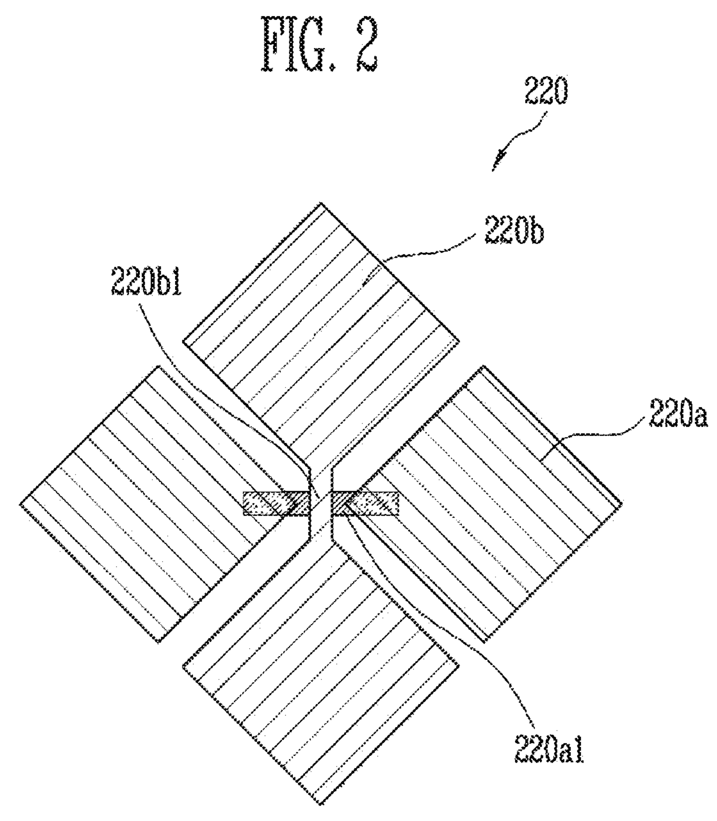
FIG. 2 is an enlarged view showing an embodiment of sensing cells shown in FIG. 1.

FIG. 1 is a plan view of a flat panel display with an integrated touch screen panel according to an embodiment. FIG. 2 is an enlarged view showing an embodiment of sensing cells shown in FIG. 1.

For convenience of illustration, some of the sensing cells are shown in FIG. 2. However, the touch screen panel has a structure in which the sensing cells shown in FIG. 2 are repeatedly arranged.

Referring to FIGS. 1 and 2, in the flat panel display with the integrated touch screen panel according to this embodiment, sensing cells 220 and sensing lines 230 for implementing the touch screen panel are formed on a sealing thin film 200 for sealing a plurality of pixels formed on a substrate 100.

In this instance, the flat panel display according to this embodiment is implemented as an organic light emitting display in which an organic light emitting element, a thin film transistor, and a capacitor are provided to each of the pixels.

Conventionally, in the organic light emitting display, a glass substrate having a cavity or plate pattern is joined with the substrate 100 under a vacuum atmosphere so as to prevent the organic light emitting elements from being exposed to moisture and oxygen.

However, the thickness of the glass substrate as a sealing substrate is large. Therefore, where a touch screen panel is formed on the glass substrate, it is disadvantageous because of the large thickness.

Accordingly, in this embodiment, the sealing thin film 200 including a pixel area of the substrate 100 is formed rather than the conventional sealing substrate for the purpose of protecting the organic light emitting elements, thereby minimizing thickness.

The sensing cells 220 include a plurality of first sensing cells 220*a* formed to be connected for each row line along a first direction, e.g., a column direction, and a plurality of second sensing cells 220*b* alternately arranged to not be overlapped with the first sensing cells 220*a* and formed to be connected for each column line along a second direction, e.g., a column direction, intersected with the first direction.

The sensing cells 220 are formed of a transparent electrode material such as indium tin oxide (ITO) so that light from a display panel disposed below the sensing cells 220 can be transmitted through the sensing cells 220.

As shown in FIG. 2, the first sensing cells 220*a* are connected to each other along each line in the first direction by a first connection pattern 220*a*1, and the second sensing cells 220*b* are connected to each other along each line in the second direction by a second connection pattern 220*b*1.

Here, the first connection pattern 220*al* and/or the second connection pattern 220*b*1 are patterned to have independent patterns, respectively. The first or second connection pattern 220*al* and 220*b*1 may be patterned to be directly/indirectly connected to the first or second sensing cells 220*a* or 220*b*, or to be integrally connected to the first or second sensing cells 220*a* or 220*b* from a process of patterning the first and second sensing cells 220*a* and 220*b*.

For example, the first connection patterns 220*al* are respectively patterned to have independent patterns in an upper or lower layer of the first sensing cells. The first connection patterns 220*al* connect the first sensing cells 220*a* to one another for each line along the first direction while being electrically connected to the first sensing cells 220*a* at an upper or lower portion of the first sensing cells 220*a*.

The first connection patterns 220*al* may be formed of a transparent electrode material such as ITO like the sensing cells 220, or may be formed of a low-resistance opaque metallic material like the sensing lines 230. The width of the first connection patterns 220*al* may be adjusted to prevent them from affecting the visual quality of the display.

The second connection patterns 220*b*1 may be integrally patterned with the second sensing cells 220*b* so as to connect the second sensing cells 220*b* to one another along each line in the second direction from a process of patterning the sensing cells 220.

In this instance, an insulating layer (not shown) for ensuring electrical isolation is interposed between the first connection patterns 220*al* and the second connection patterns 220*b*1.

The sensing lines 230 are used to connect the sensing cells 220 to a driving circuit for each line along the first or second direction. The sensing lines 230 are arranged in a non-touch active area formed at the outside of a touch active area. Here, the touch active area is an area corresponding to the pixel area of the display panel.

For example, the sensing lines 230 are electrically connected to row lines of the first sensing cells 220*a* and column lines of the second sensing cells 220*b*, respectively, so as to be connected to the driving circuit (not shown) of the touch panel, such as a position detecting circuit.

An edge pattern (not shown) such as a black matrix of a window (not shown) may be positioned on the sensing lines 230. Thus, it is possible to prevent the sensing lines 230 from being seen, so that the material of the sensing lines 230 is selected from a large variety of options. For example, the sensing lines 230 may be formed of not only a transparent electrode material used to form the sensing cells 220 but also a low-resistance metallic material such as molybdenum (Mo), silver (Ag), titanium (Ti), copper (Cu), aluminum (Al) or Mo/Al/Mo.

In this embodiment, as shown in FIG. 1, the sensing lines 230 extend to the substrate 100 of the display panel from an end of the sealing thin film 200 so as to be electrically connected to a flexible printed circuit board (FPCB) 300 attached to the substrate 100.

This can be implemented because the thickness of the sealing thin film 200 is sufficiently thin. Particularly, an end portion A of the sealing thin film 200 is formed to be inclined (see FIG. 3), so that it is possible to prevent the sensing lines passing over the end portion from being broken. Hereinafter, this will be described in detail with reference to FIG. 4.

In this instance, the FPCB 300 is electrically connected a driving IC 120 for driving a plurality of pixels (not shown) in the pixel area of the display panel. Accordingly, in this embodiment, the touch screen panel and the display panel use only one FPCB. The driving circuit of the touch panel, which drives the touch screen panel, may be integrated on the driving IC 120.

The touch screen panel configured as described above is a capacitive touch screen panel. If a contact object such as a user's finger or stylus pen comes in contact with the touch screen panel, a change in capacitance caused by a contact position is transferred from the sensing cells 220 to the driving circuit (not shown) via the sensing lines 230. Then, the change in capacitance is converted into an electrical signal by X and Y input processing circuits (not shown), thereby detecting the contact position.

Figure 3:
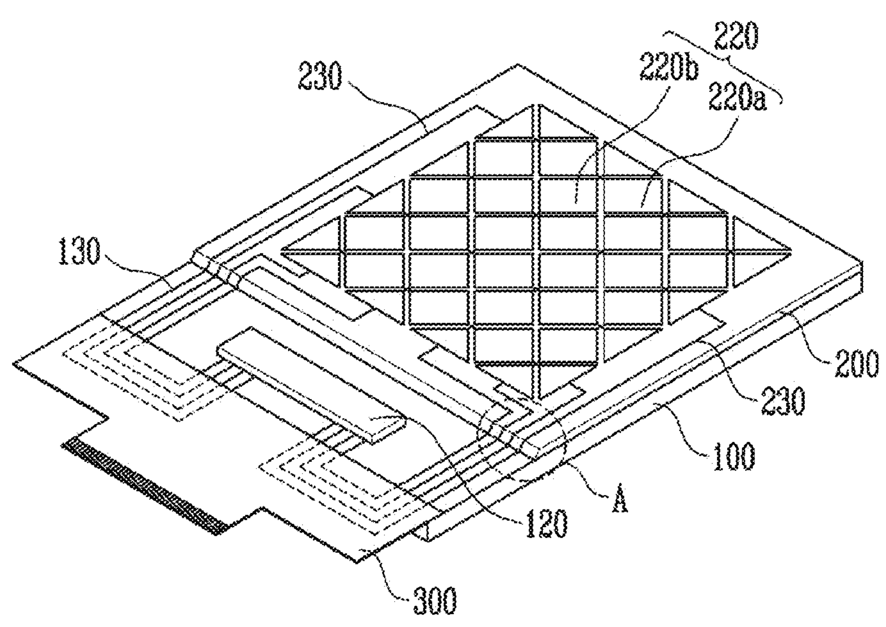
FIG. 3 is a perspective view of a flat panel display with an integrated touch screen panel according to an embodiment of the present invention.
Figure 4:
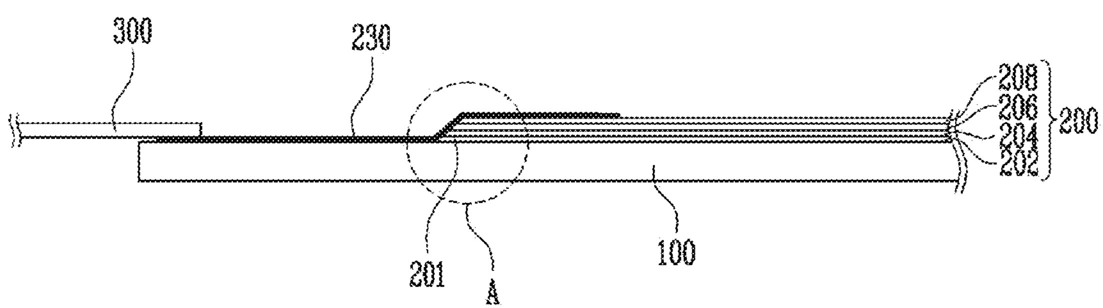
FIG. 4 is a schematic sectional view showing a region including specific portion A of FIG. 3.
Figure 5:
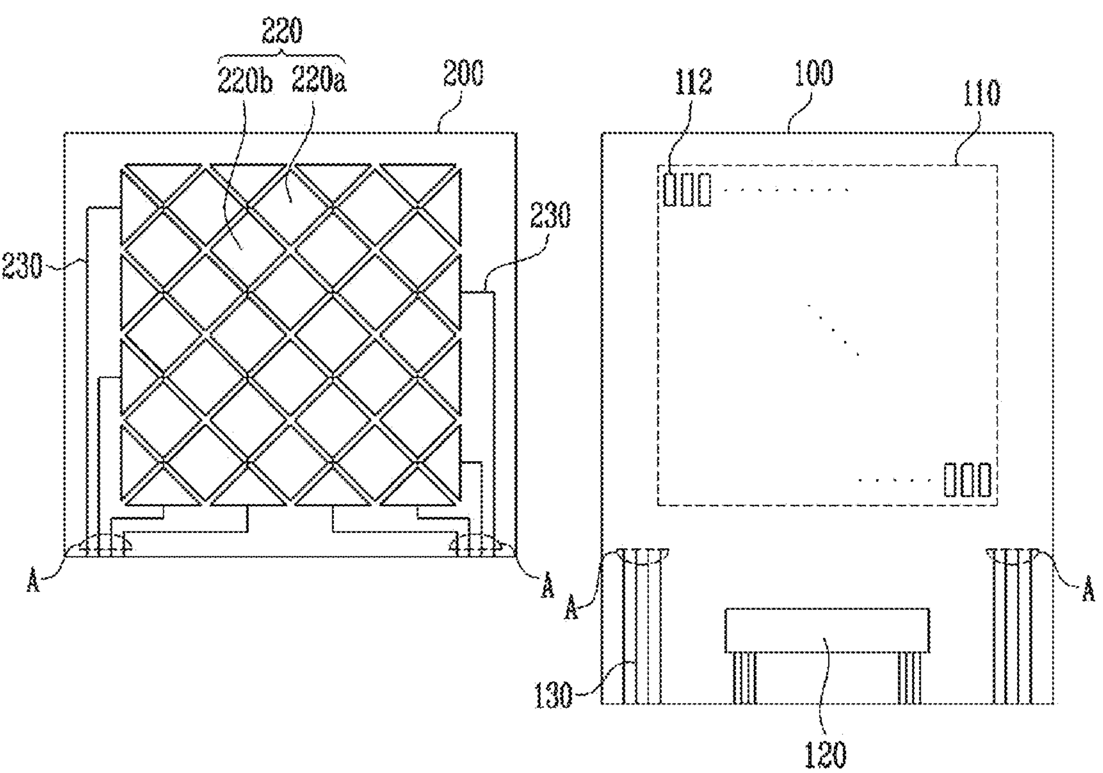
FIG. 5 is a set of separate plan views showing a sealing thin film and a substrate shown in FIG. 3.

FIG. 3 is a perspective view of a flat panel display with an integrated touch screen panel according to an embodiment. FIG. 4 is a separate plan view showing a sealing thin film and a substrate shown in FIG. 3. FIG. 5 is a schematic sectional view showing a region including specific portion A of FIG. 3.

Referring to FIGS. 3 to 5, this embodiment is a flat panel display with an integrated touch screen panel, in which sensing cells 220 and sensing lines 230 for implementing the touch screen panel are formed on a sealing thin film 200 for sealing a plurality of pixels 112 formed on a substrate 100.

Here, the flat panel display according to this embodiment is implemented as an organic light emitting display in which an organic light emitting element (not shown), a thin film transistor (not shown) and a capacitor (not shown) are provided to each of the pixels 112.

That is, touch sensing patterns including the sensing cells 220 and the sensing lines 230 are formed on the top surface of the sealing thin film 200 formed on the substrate 100 including a pixel area 110 so as to seal the pixel area 110 in which the pixels 112 are formed.

In this instance, the sensing cells 220 are formed in an area overlapped with the pixel area 110, and the sensing lines 230 are formed in an area corresponding to the outside of the pixel area 110.

In this embodiment, the sensing lines 230 extend to the substrate 100 of the display panel via an end portion A of the sealing thin film 200, so as to be electrically connected to the FPCB 300 attached to one end of the substrate 100.

This can be implemented because the thickness of the sealing thin film 200 is sufficiently thin. Particularly, the end portion A of the sealing thin film 200 is formed to be inclined, so that it is possible to prevent the sensing lines passing through the end portion from being broken.

The sealing thin film 200 is formed to protect the organic light emitting element provided to each of the pixels 112, and may be implemented as a stacked structure of a plurality of organic and inorganic layers.

More specifically, referring to FIG. 4, the sealing thin film 200 may be formed as, for example, a structure in which a first organic layer 202, a first inorganic layer 204, a second organic layer 206 and a second inorganic layer 208 are alternately stacked so as to effectively block oxygen and moisture from the exterior.

The first and second organic films 202 and 206 of the sealing thin film 200 prevents nano-crack and micro-crack defects formed in the first and second inorganic layers 204 and 208 from being continuously formed, so that it is possible to decrease a moisture transmission rate by preventing an infiltration path of moisture and oxygen and to reduce stress left in the first and second organic layers 204 and 208.

In this instance, the first and second organic layers 202 and 206 may be formed of one selected from the group consisting of epoxy, acrylate and urethane acrylate. The first and second inorganic layers 204 and 208 may be formed of one selected from the group consisting of $Al_xO_y$ and $Si_xO_y$.

Although the sealing thin film 200 is implemented as a stacked structure of four layers, the thickness of the sealing thin film 200 can be implemented to be considerably thinner than that of the conventional sealing substrate, i.e., the conventional glass substrate.

Thus, the sensing lines 230 formed on the sealing thin film 200 can be formed to run over the sealing thin film 200 and the substrate through a process such as the same photolithography process as shown in these figures.

However, a risk exists that the sensing lines 230 that pass through the end portion A of the sealing thin film 200 may be broken by the step difference of the end portion in the patterning process.

Accordingly, in this embodiment, an area 201 of the end portion of the sealing thin film 200 is formed to be inclined as shown in FIG. 4, thereby overcoming such a problem.

That is, the sensing lines 230 extend to the substrate 100 of the display panel via the end portion A of the sealing thin film 200, so as to be electrically connected to the FPCB 300 attached to the one end of the substrate 100.

In this instance, the sensing lines 230 may also be connected to a driving IC 120 of the display panel via the FPCB 300. The driving IC 120 may include a control circuit for driving the touch screen panel, a position detecting circuit, or the like as well as a control circuit for driving the display panel.

Accordingly, the touch screen panel and the display panel share only one FPCB 300 with each other. The FPCB 300 is connected to an end of the substrate 100 (an end at which a pad portion (not shown) is formed) so as to be electrically connected to driving lines (not shown) of the display panel. Thus, the FPCB 300 can supply a control signal for controlling the display panel. Further, the FPCB 300 can supply a control signal for controlling the touch screen panel via the sensing lines 230.

In this case, the FPCB 300 is implemented with a configuration in which an FPCB for driving the display panel and an FPCB for driving the touch screen panel are integrated with each other.

Thus, in this embodiment, the bonding and testing process of the FPCB 300 is simplified, so that it is possible to facilitate manufacturing processes and to decrease product cost, as compared with a case where FPCBs for respectively driving the touch screen panel and the display panel are individually provided.

While certain inventive aspects have been described in connection with certain exemplary embodiments, it is to be understood that the invention is not limited to the disclosed embodiments, but, on the contrary, is intended to cover various modifications and equivalent arrangements.

What is claimed is:

1. A display device comprising:

a substrate comprising a first area and a second area adjacent to the first area, the first area comprising a pixel area;

a pixel in the pixel area, the pixel comprising an organic light emitting element;

a sealing thin film comprising at least one organic layer and at least one inorganic layer, the sealing thin film covering the first area of the substrate;

a sensing cell on the sealing thin film and configured to sense a touch;

a sensing line on the sealing thin film and electrically connected to the sensing cell;

a driving circuit in the second area;

a flexible printed circuit board attached to a portion of the substrate in the second area and comprising a first portion configured to drive the pixel and a second portion configured to drive the sensing cell; and a driving line electrically connected to the driving circuit and the pixel, wherein the flexible printed circuit board is electrically connected to each of the driving line and the sensing line, wherein the sensing line comprises a first sensing line and a second sensing line spaced apart from each other in a first direction, wherein the first sensing line extends from a first side of the pixel area, and at least a portion of the first sensing line extends in a second direction different from the first direction, wherein the second sensing line extends from a second side of the pixel area, and at least a portion of the second sensing line extends in the second direction, and wherein the driving circuit is disposed between the first sensing line and the second sensing line in the second area.

2. The display device of claim 1, wherein the sensing cell comprises a first sensing cell portion and a second sensing cell portion spaced apart from each other in the second direction, wherein the first sensing cell portion and the second sensing cell portion each form an electrical path extending in the first direction, wherein the first sensing cell portion is connected to the first sensing line at the first side and is not connected to the second sensing line at the second side, and wherein the second sensing cell portion is connected to the second sensing line at the second side and is not connected to the first sensing line at the first side.

3. The display device of claim 1, wherein an end portion of the sealing thin film faces the flexible printed circuit board and is inclined.

4. The display device of claim 3, wherein the sensing line passes over the end portion.

5. The display device of claim 4, wherein the sensing line is arranged in the second direction across the sealing thin film and a portion of the substrate where the sealing thin film is not disposed.

6. The display device of claim 5, wherein the sensing line is directly disposed on the substrate in the second area and directly disposed on the sealing thin film in the first area.

7. The display device of claim 3, wherein the sensing line is disposed on the end portion, and the sealing thin film prevents the sensing line from being broken.

8. The display device of claim 1, when viewed in cross-section, the sensing line flatly extends on the sealing thin film except at an end portion of the sealing thin film, flatly extends on a portion of the substrate where the sealing thin film is not disposed, and inclinedly extends on the end portion.

9. The display device of claim 1, wherein the at least one inorganic layer includes an inorganic layer disposed on an uppermost portion of the sealing thin film.

10. The display device of claim 1, wherein the sealing thin film comprises a first organic layer and a first inorganic layer directly on the first organic layer, and wherein the first organic layer extends longer than the first inorganic layer.

11. The display device of claim 10, wherein the sealing thin film further comprises a second organic layer on the first inorganic layer and a second inorganic layer directly on the second organic layer, and wherein the second organic layer extends shorter than the first inorganic layer and longer than the second inorganic layer.

12. The display device of claim 1, wherein the first side and the second side face each other, wherein the first area and the second area are adjacent in the second direction, and wherein the first sensing line, the second sensing line, and the driving circuit overlap in the first direction.

13. The display device of claim 1, wherein the driving circuit extends in the first direction.

14. The display device of claim 13, wherein the driving circuit is spaced apart from the pixel area in the second direction.

15. The display device of claim 1, wherein the first area comprises a touch active area corresponding to the pixel area, and wherein the sealing thin film does not cover the second area of the substrate.

16. An electronic device, comprising:

a substrate comprising a first area and a second area adjacent to the first area, the first area comprising a pixel area;

a pixel in the pixel area, the pixel comprising an organic light emitting element;

a sealing thin film comprising at least one organic layer and at least one inorganic layer, the sealing thin film covering the first area of the substrate;

a sensing cell on the sealing thin film and configured to sense a touch;

a sensing line on the sealing thin film and electrically connected to the sensing cell;

a window on the sensing line;

a driving circuit in the second area;

a flexible printed circuit board attached to a portion of the substrate in the second area and comprising a first portion configured to drive the pixel and a second portion configured to drive the sensing cell; and a driving line electrically connected to the driving circuit and the pixel, wherein the flexible printed circuit board is electrically connected to each of the driving line and the sensing line, wherein the sensing line comprises a first sensing line and a second sensing line spaced apart from each other in a first direction, wherein the first sensing line extends from a first side of the pixel area, and at least a portion of the first sensing line extends in a second direction different from the first direction, wherein the second sensing line extends from a second side of the pixel area, and at least a portion of the second sensing line extends in the second direction, and wherein the driving circuit is disposed between the first sensing line and the second sensing line in the second area.

17. The electronic device of claim 16, wherein the sensing line comprises an opaque metallic material.

18. The electronic device of claim 17, wherein the window comprises a black matrix on the sensing line.

19. The electronic device of claim 17, wherein the sensing line comprises at least one of molybdenum (Mo), silver (Ag), titanium (Ti), copper (Cu), aluminum (Al) or Mo/Al/Mo.

20. The electronic device of claim 16, wherein an end portion of the sealing thin film faces the flexible printed circuit board and is inclined.

* * * * *